Patented Oct. 15, 1935

2,017,827

UNITED STATES PATENT OFFICE 2,017,827

GUM INHIBITOR FOR MOTOR FUEL

William J. Bannister, Terre Haute, Ind., assignor to Commercial Solvents Corporation, Terre Haute, Ind., a corporation of Maryland No Drawing. Application February 23, 1934, Serial No. 712,661

19 Claims. (Cl. 44—9)

My invention relates to improved means for inhibiting gum formation in hydrocarbon mixtures. More specifically, my invention relates to compositions for use as gum inhibitors in liquid hydrocarbon mixtures containing unsaturated compounds, as, for example, gasolines prepared by the cracking process.

It is known that hydrocarbon mixtures, and particularly cracked gasolines, tend to discolor and form gum when stored for considerable periods of time. This is especially true if the materials are exposed to light. The gum formation and discoloration have been attributed to various reactions such as condensation or polymerization of the more unsaturated compounds in the mixture, but it may be said that the reactions involved are not definitely understood at the present time.

A number of materials have been recommended in the past for use as gum inhibitors for motor fuels. Among these may be mentioned alpha naphthol, anthraquinone, acetanilide and phthalimidine. However, all of these substances have had certain disadvantages, particularly in their cost and the concentrations necessary for satisfactory inhibition of gum formation.

I have now discovered that the reaction products of monocyclic phenols and aliphatic ketones are especially suitable as gum inhibitors. The cost of production of such compounds is low, and relatively low concentrations are necessary for satisfactory inhibition of gum formation in motor fuels. Compounds of this type may be the simpler crystalline reaction products or the more complex resin-like products such as those described in Patent No. 1,948,469 and copending applications Ser. Nos. 571,864 and 571,865 by Kenneth M. Irey, filed October 29, 1931. Compounds of the latter type constitute products of further reaction of the initial crystalline materials with additional ketone.

I prefer to utilize as gum inhibitors the crystalline reaction products which may be termed bis-[hydroxy-aryl]-dialkyl-methanes. The simplest compound of this type is bis-[4-hydroxyphenyl]-dimethyl-methane, commonly known as diphenylol propane. This compound is a suitable gum inhibitor, but I prefer to utilize the corresponding reaction product of acetone and o-cresol. This compound, which may be termed beta-beta-bis-[3-methyl-4-hydroxy-phenyl]-propane or more simply, di-o-cresylol propane, constitutes an extremely efficient gum inhibitor. This material will lengthen the normal time for gum formation in gasoline, according to the accelerated oxidation test, as much as fourfold when employed in a concentration as low as .008 gram per 100 c.c.

The type of compound which I propose to use may be represented structurally as follows

where X represents an alkyl group and Y represents a hydroxyl-phenyl group or a methylated hydroxyphenyl group. Specific examples of this type of compound are:

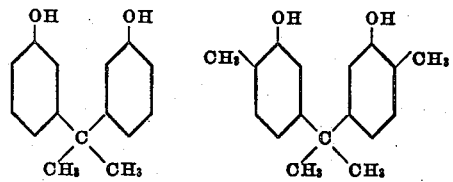

diphenylol propane     di-ortho-cresylol propane

In determining the efficiency of a gum inhibitor it is necessary to determine the normal "induction period" for the hydrocarbon mixture and subsequently to determine the induction period for the mixture containing the gum inhibitor. This induction period is the time of storage which elapses before gum formation becomes evident; and since this normally amounts to weeks or even months, it is desirable to utilize an accelerated test. The oxygen bomb test, which has been described by various investigators in this field, serves as a relatively accurate index, and this test was used in the evaluation of the compounds of the present invention. The hydrocarbon mixture was placed in the bomb under 100 lbs. pressure of oxygen and the temperature raised to 100° C. over a period of 20 minutes, preferably by means of a boiling water bath. After reaching 100° C. this temperature was maintained until a relatively marked drop in pressure indicated that oxidation reactions had begun to take place to a substantial extent, i. e. that gum formation had begun to take place. The induction period was taken as the time elapsed after the 20 minute heating period and before the pressure drop. The same procedure was then repeated for the mixtures containing the inhibiting agents. The results of tests of this nature will be given in the following examples, which will illustrate the method for carrying out my invention and the advantages secured thereby.

Example I

Four parts of o-cresol and one part of acetone by weight were reacted in the presence of a small amount of a mineral acid condensation catalyst at a temperature of 70–80° C. for a period of 24 hours. The product thus obtained was washed with water to remove the mineral acid and steam distilled to remove unreacted cresol. The resulting material, comprising a mixture of o-cresol-acetone resin and di-o-cresylol propane, was utilized as the inhibiting agent in the bomb oxidation process outlined above. A commercial grade of gasoline was tested without the inhibitor and with a concentration of 10 milligrams of inhibitor per 100 c. c. of gasoline. The induction period when using this material at this concentration was found to be 150 minutes as compared with 35 minutes for the gasoline without inhibiting agent.

Example II

A mixture of o-cresol-acetone resin and di-o-cresylol propane, obtained as in Example I above, was treated with a relatively large amount of toluene which served to dissolve the resinous reaction products, and to throw the di-o-cresylol propane out of solution in the form of pure crystals. These crystals were separated from the supernatant liquor and further washed to secure the desired purity.

A commercial grade of gasoline was then tested with varying amounts of the di-o-cresylol propane according to the bomb oxidation process outlined above. The induction periods for the gasoline with and without inhibitor are shown below:

| Concentration of di-o-cresylol propane (milligrams per 100 c. c. of gasoline) | Induction period (minutes) |
|---|---|
| 0.0 | 35 |
| 5.0 | 110 |
| 7.5 | 115 |
| 8.25 | 135 |
| 8.5 | 145 |
| 10.0 | 230 |

Example III

Diphenylol propane was prepared according to the process outlined in Example II, utilizing phenol in place of o-cresol. The purified crystalline product in a concentration of 10 milligrams per 100 c. c. of gasoline was found to give an induction period of 85 minutes as compared with the standard 35 minutes for pure gasoline.

Example IV

A mixed resinous product was prepared according to the procedure of Example I utilizing in place of pure o-cresol a mixture comprising approximately 15% o-cresol, 85% m-cresol and traces of p-cresol. The resulting resin, when employed in a concentration of 10 milligrams per 100 c. c. of gasoline, gave an induction period of 95 minutes.

Example V

A mixture of o-cresol-acetone resin and di-o-cresylol propane was prepared as in Example I, except that the reaction was stopped before extensive resinification had taken place with the result that the product contained an unusually large percentage of unreacted di-o-cresylol propane. The mixture thus obtained, when employed in a concentration of 10 milligrams per 100 c. c. of gasoline, gave an induction period of 190 minutes.

It may be seen from the above examples that although some of these materials are more efficient than others, all the compounds of this type constitute satisfactory gum inhibitors. The choice of one or another of the compounds in this group for use as an inhibitor in a given hydrocarbon mixture will depend primarily upon economic considerations. For example, depending upon the relative prices of raw materials, it may be more advantageous to utilize the resinous mixture of Example III instead of the pure di-o-cresylol propane of Example II, although the latter gives a greater absolute increase in induction period for a given concentration.

Although the various materials of this type differ considerably in their gum inhibiting power, one skilled in the art can readily determine by preliminary oxygen bomb tests the approximate concentration to be employed. In general it may be said that concentrations of from 1 milligram to 20 milligrams per 100 c. c. of gasoline will be suitable, and in most cases from 5 milligrams to 15 milligrams per 100 c. c. will be found to be quite satisfactory.

In any case, however, it is preferred to use an amount of the inhibitor somewhat less than the amount of gum that would otherwise be formed by the fuel being treated.

The ketone-phenol reaction products of my invention are all sufficiently soluble in gasoline or other petroleum hydrocarbon mixtures to enable their use in a concentration suitable for satisfactory inhibition of gum formation. However, these compounds are generally not sufficiently soluble in hydrocarbons to enable the addition of these materials to be made by the use of concentrated solutions. However, these reaction products may be dissolved in the corresponding ketones from which they were formed, in concentration of 50% or more, and small amounts of the resulting solution may be added to the hydrocarbon mixture. In such a case the compound will usually be initially thrown out of solution in the form of fine crystals, or a fine dispersion, but will redissolve on standing. Equivalent methods of introducing these compounds into hydrocarbon mixtures will be apparent to those skilled in the art. For example, gasoline could be percolated through a mass of di-o-cresylol propane crystals. By carefully controlling the rate of flow to secure the desired concentration, such a procedure could be carried out automatically in the transfer of gasoline to storage tanks.

Although I have illustrated my invention by means of certain specific examples, it is to be definitely understood that these are illustrative only and are not to be taken as limiting the scope of my invention. My invention applies broadly to the use of reaction products of monocyclic phenols and aliphatic ketones. As equivalents of the acetone of the examples there may be mentioned methyl ethyl ketone, diethyl ketone, ethyl propyl ketone, dipropyl ketone, and the like. Various equivalents of the phenolic compounds, such as the xylenols, xenols (phenyl phenols), catechol, resorcinol, and similar compounds, will readily occur to one skilled in the art. Among these various phenols, those which I prefer to use in my process are the ortho substituted phenols, and preferably those which are unsubstituted in the para position. The reaction conditions under which the phenol-ketone products are prepared are not essential to my invention and any of the known processes may be employed. Of course, as will be apparent to one skilled in the art, there will be a relative difference in the efficiency of the products under different reaction conditions, but this effect will be quantitative rather than qualitative. In general it may be said that the use of any equivalents or any modifications of procedure which would naturally occur to one skilled in the art are included within the scope of my invention.

My invention now having been described, which I claim is:

1. A liquid hydrocarbon mixture of the type tending to form gum during storage, containing as a gum inhibiting agent an amount of a reaction product formed by condensing a monocyclic phenol and an aliphatic ketone substantially less than that of the potential gum of the said liquid hydrocarbon mixture.

2. A petroleum distillate motor fuel of the type tending to form gum during storage, containing an amount of a reaction product formed by condensing a monocyclic phenol and an aliphatic ketone substantially less than that of the potential gum of the said motor fuel.

3. Gasoline produced by the cracking of petroleum oils, containing an amount of a reaction product formed by condensing an ortho-substituted monocyclic phenol and an aliphatic ketone substantially less than that of the potential gum of the said gasoline.

4. Gasoline produced by the cracking of petroleum oils, containing a small amount of a bis-[hydroxy-phenyl]-dialkyl-methane.

5. Gasoline produced by the cracking of petroleum oils, containing a small amount of beta-beta-bis-[3-methyl-4-hydroxy-phenyl]-propane.

6. Gasoline produced by the cracking of petroleum oils, containing an amount of a phenol-aliphatic ketone resin substantially less than that of the potential gum of said gasoline.

7. Gasoline produced by the cracking of petroleum oils, containing an amount of an o-cresol-acetone resin substantially less than that of the potential gum of said gasoline.

8. Gasoline produced by the cracking of petroleum oils containing a reaction product formed by condensing an ortho-substituted monocyclic phenol and an aliphatic ketone in a concentration ranging from 5 milligrams to 20 milligrams per 100 c. c. of gasoline.

9. Gasoline produced by the cracking of petroleum oils containing bis-[hydroxy-phenyl]-dialkyl-methane in a concentration ranging from 5 milligrams to 20 milligrams per 100 c. c. of gasoline.

10. Gasoline produced by the cracking of petroleum oils containing beta-beta-bis-[3-methyl-4-hydroxy-phenyl]-propane in a concentration ranging from 5 milligrams to 20 milligrams per 100 c. c. of gasoline.

11. Gasoline produced by the cracking of petroleum oils containing a phenol-aliphatic ketone resin in a concentration ranging from 5 milligrams to 20 milligrams per 100 c. c. of gasoline.

12. Gasoline produced by the cracking of petroleum oils containing an o-cresol-acetone resin in a concentration ranging from 5 milligrams to 20 milligrams per 100 c. c. of gasoline.

13. A process for prolonging the induction period for gum formation in a liquid hydrocarbon mixture of the type tending to form gum during storage, which comprises maintaining said mixture in contact with an amount of a reaction product formed by condensing a monocyclic phenol and an aliphatic ketone substantially less than that of the potential gum of the said hydrocarbon mixture.

14. A process for prolonging the induction period for gum formation in a petroleum distillate motor fuel of the type tending to form gum during storage, which comprises maintaining said motor fuel in contact with an amount of a reaction product formed by condensing a monocyclic phenol and an aliphatic ketone substantially less than that of the potential gum of the said motor fuel.

15. A process for prolonging the induction period for gum formation in gasoline produced by the cracking of petroleum oils which comprises maintaining said gasoline in contact with an amount of a reaction product formed by condensing an ortho-substituted monocyclic phenol and an aliphatic ketone substantially less than that of the potential gum of the said gasoline.

16. A process for prolonging the induction period for gum formation in gasoline produced by the cracking of petroleum oils which comprises maintaining said gasoline in contact with a small amount of a bis-[hydroxy-phenyl]-dialkyl-methane.

17. A process for prolonging the induction period for gum formation in gasoline produced by the cracking of petroleum oils which comprises maintaining said gasoline in contact with a small amount of beta-beta-bis-[3-methyl-4-hydroxy-phenyl]-propane.

18. A process for prolonging the induction period for gum formation in gasoline produced by the cracking of petroleum oils which comprises maintaining said gasoline in contact with an amount of a phenol-aliphatic ketone resin substantially less than that of the potential gum of said gasoline.

19. A process for prolonging the induction period for gum formation in gasoline produced by the cracking of petroleum oils which comprises maintaining said gasoline in contact with an amount of an o-cresol-acetone resin substantially less than that of the potential gum of said gasoline.

WILLIAM J. BANNISTER.